April 6, 1937.  H. E. BUCKLEN  2,075,884
CARBURETOR CONTROL
Filed Aug. 10, 1932   2 Sheets-Sheet 1

Inventor:
Herbert E. Bucklen

April 6, 1937.   H. E. BUCKLEN   2,075,884
CARBURETOR CONTROL
Filed Aug. 10, 1932   2 Sheets-Sheet 2

Inventor:
Herbert E. Bucklen.

Patented Apr. 6, 1937

2,075,884

UNITED STATES PATENT OFFICE 2,075,884

CARBURETOR CONTROL

Herbert E. Bucklen, Elkhart, Ind.

Application August 10, 1932, Serial No. 628,174

8 Claims. (Cl. 123—119)

The present invention relates generally to fuel systems for internal engines, such as those used in automobiles and the like, and is principally concerned with the provision of new and improved means for controlling the carburetors of such systems.

In automobile motors and the like it is customary to provide one or more carburetors for mixing the fuel with quantities of air and to provide control means for modifying the fuel mixture to accommodate the same to various operating conditions. For example, the conventional carburetor is usually provided with some form of controlled choke valve which is normally open but which is adapted to be closed, either partially or wholly, to restrict the quantity of air introduced into the carburetor when starting the motor to produce a richer mixture, particularly in cold weather, and in initially operating the same until the motor reaches normal operating temperature.

Such choke controls are usually arranged to be manually controlled by the operator of the automobile or other vehicle, and generally the only measure of control realized is by the operator closing the choke valve until the motor has warmed up and then opening the same to its normal wide open position, the operator making no attempt whatsoever to move the choke valve to various positions to correspond to the conditions under which the motor is operating. For example, it would be desirable to gradually open the choke valve as the motor comes up to temperature in order that the fuel mixture shall be at the correct degree of richness required by the particular temperature at which the motor is operating. Thus, it would theoretically be desirable to close or practically close the choke valve when first starting the motor and then gradually open the valve in degrees proportional to the rise in temperature of the motor. It is out of the question, of course, to expect that the normal operator of the vehicle will concern himself with manually positioning the choke valve in various positions as the temperature of the motor rises during the initial operation thereof. Likewise, it would be out of the question to expect the operator, in starting the motor, to open the choke valve to exactly the position required by the temperature of the motor when the same is being started. Usually, as stated above, the operator in starting the motor merely closes the choke valve until the motor is started without paying any attention whatsoever to whether or not the temperature of the motor at the time it is being started requires the choke valve to be fully closed.

What has been said above is equally applicable to carburetors in which a metering pin, needle valve or the like is manually adjustable to accommodate the carburetor for various conditions. A considerable number of carburetors in use at the present time are provided with an auxiliary jet which is controlled by a metering valve or the like. This valve is capable of being manually adjusted according to temperature and other operating conditions. However, like the choke valve mentioned above, it is more or less a practical impossibility to secure any appreciable measure whatsoever of control of the metering pin or valve to position the same in accordance with the operating conditions, such as temperature and the like, of the automobile engine.

With the above factors in mind, the present invention is particularly concerned with a control mechanism for carburetors and the like, which control mechanism embodies manual means for opening the choke valve, metering valve, or the like in connection with means responsive to the temperature of the motor for closing either or both of these valves without any attention whatsoever on the part of the operator. Preferably, such temperature responsive means is arranged or has the thermal element thereof disposed adjacent the exhaust manifold of the engine so that the operating temperature of the latter is practically immediately effective in gradually restoring the choke valve or the metering valve, or both, to a normal position, which position depends primarily upon the temperature of the motor.

Another object of the present invention is the provision of means for modifying the control effected by the manual means, which modifying means is constructed and arranged to be positioned in accordance with the temperature of the motor. Specifically, the present invention contemplates a construction wherein a limited movement of the manual means is controlled by thermostatic means responsive to the temperature of the motor. Moreover, such thermostatic means is of itself effective in not only gradually shifting the manual means back to its normal position but also shifting the adjustable part or parts of the carburetor controlled by the manual means. In this respect, therefore, the present invention provides construction wherein all the operator has to do is to actuate the manual means, the limit of movement thereof and the gradual restoration thereof to normal position being controlled by means entirely automatic and which requires no attention on the part of the operator whatsoever.

These and other objects of the present invention will be apparent to those skilled in the art after a consideration of the following detailed description of the preferred structural embodiment, taken in conjunction with the accompanying drawings illustrating such embodiment and in which.

Figure 1:
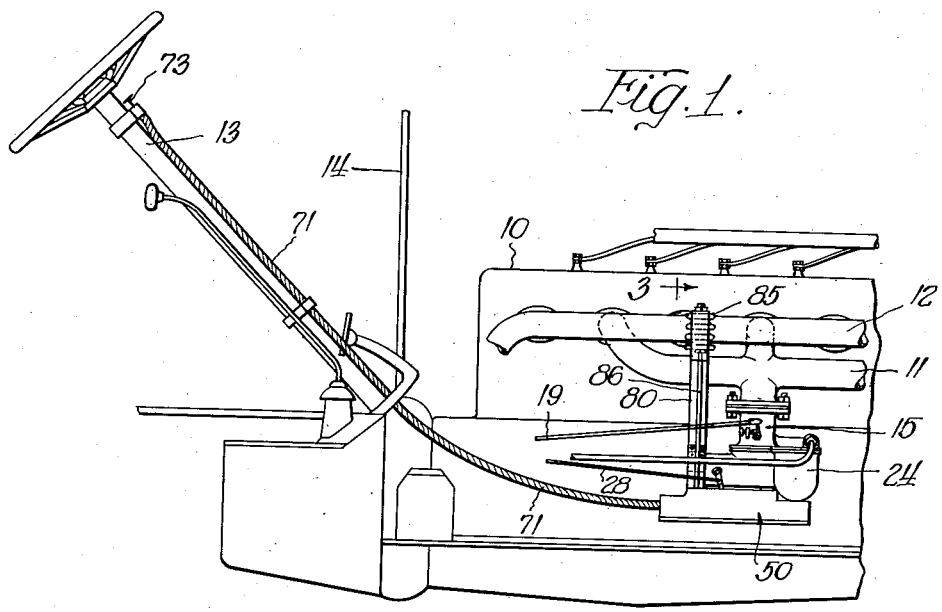
Figure 1 is a side view of an automobile motor embodying the principles of the present invention.

Referring now to the drawings, particularly Figure 1, the reference numeral 10 indicates an automobile engine of conventional construction and embodying an intake manifold 11 and an exhaust manifold 12. The steering column 13 of the automobile provides a convenient mounting for certain of the carburetor controls later to be described in detail, but it is to be understood that the dash or instrument board 14 may be utilized for such purposes if desired.

The carburetor for the motor 10 is represented in its entirety by the reference numeral 15. The carburetor receives its fuel from a supply line 16 and includes a mixing tube 17 in which is disposed a throttle valve 18 of the butterfly type controlled by a rod 19 leading to a throttle lever on the steering wheel or dash or an accelerator pedal (not shown). A choke tube or venturi 21 is disposed within the mixing tube 17 adjacent the main jet or nozzle 23 of the carburetor. The latter also includes a float chamber 24 and a main air intake or inlet 25 controlled by means of a choke valve 26 pivotally mounted in the intake 25 and provided with an arm 27 to which is connected a pull rod 28 normally adapted to be controlled by the operator. The pivot shaft 30 of the choke valve 26 also carries a second arm 35 (Figure 3) somewhat longer than the arm 27 for a purpose which will appear later. The carburetor 15 also includes an auxiliary or idling fuel jet 38 controlled by a shiftable or adjustable member 39 in the form of a needle valve or the equivalent. The main jet 23 receives fuel from the float chamber 24 through a bore or conduit 41 and the auxiliary or idling jet 38 receives its fuel through a bore 42.

The shiftable needle valve or metering pin 39 has a threaded connection with the body of the carburetor and may be rotated to control the amount of fuel passing through the auxiliary or idling jet 38. Naturally, the farther the metering pin 39 is moved from its seat the greater the amount of fuel passing through the auxiliary jet 38 and the richer will be the fuel mixture. Preferably the metering valve or metering pin 39 extends downwardly from the carburetor casing and is controlled by means which will now be described in detail.

Figure 3:
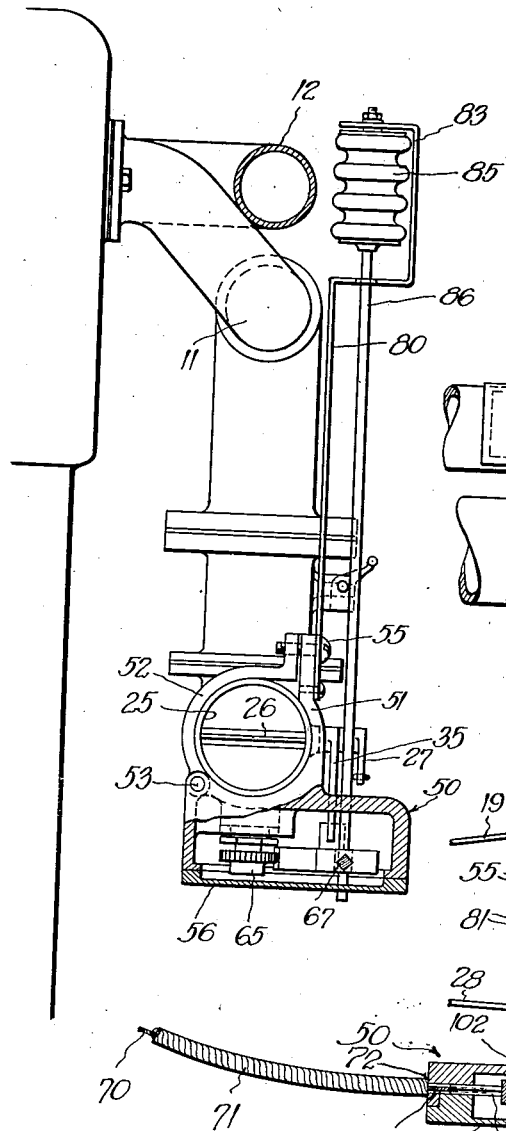
Figure 3 is a vertical section taken along the line 3—3 of Figure 1.

A casing 50 is removably associated with the carburetor 15 and for this purpose is provided with an upwardly disposed lug 51 and a hinged member 52 pivotally secured to the casing 50, as indicated at 53 in Figure 3. The two parts 51 and 52 are formed to fit around the air intake 25 of the carburetor, these parts being adapted to be securely clamped around the intake 25 by means such as screws 55. The casing 50 also includes a removable bottom plate 56 which serves to enclose the mechanism mounted within the casing 50.

The lower end of the metering pin 39 projects into the interior of the casing 50 when the latter is positioned on the carburetor. This end of the metering pin 39 is provided with a pinion 65 suitably pinned or otherwise secured thereto. A shiftable member 66 in the form of a rack is movably mounted within the casing 50 and guided and supported therein by guides 67 in the form of squared pins or the equivalent. If desired, of course, the rack may rest directly on and be guided by the bottom plate 56, or any other suitable guiding or supporting means may be provided for the rack member 66. The rack 66 is provided with teeth 70 meshing with the pinion 65, and movement of the rack 66 longitudinally of the casing effects a rotation of the metering pin 39 which serves to move the latter toward or away from its seat, thereby controlling the flow of fuel to the auxiliary jet 38.

According to the principles of the present invention two separate means are provided for controlling the position of the shiftable rack 66. Preferably, one means takes the form of a Bowden wire or flexible shaft 70 enclosed by a flexible cover or casing 71 anchored, as at 72, to one end of the casing 50. The upper end of the Bowden wire 70 is provided with an operating button 73 of conventional construction, and preferably this end of the Bowden cable is carried upon the steering column 13 of the automobile. The operating end of the Bowden wire 70 is secured in any manner desired to the rack 66, as by being connected with one of the bars 67, so that movement of the button 73, reacting through the flexible casing 71 on the casing 50, serves to shift the rack member 66 and thereby position the metering pin 39. The parts are preferably so arranged that when the button 73 is pulled the rack 66 is shifted to the left in Figures 2 and 4 to open the metering valve 39 or, in other words, to move the latter away from its seat, thereby admitting more fuel through the auxiliary inlet 38. If desired the Bowden wire control may be connected with the other end of the rack in which case the button 73 would be depressed to shift the rack toward the left as viewed in Figures 2 and 4.

It may also be desirable to have this movement of the operating button 73 effective to close the choke valve 26. For this purpose the rack 66 carries a lug 75 which abuts against the arm 35, the latter extending into the casing 50 through a slot 77. In this way whenever the button 73 is moved outwardly the rack 66 is moved to the left, which thereby shifts the lug 75 and swings the arm 35 in a counterclockwise direction, thus moving the choke valve 26 toward its closed position.

It is to be understood that the Bowden cable 71 or the equivalent thereof may be used to control either the choke valve 26 or the metering valve 39 singly; that is, the controls for either of these valves may be dispensed with if desired.

As mentioned above, the present invention contemplates automatic means responsive to the temperature of the engine for augmenting or modifying the control of the valves 26 and 39, or either of them, in accordance with the temperature of the motor. For this purpose the lug 51 carries an upwardly disposed standard 80 secured to the lug by screws or the like 81 and having its upper end 83 formed to receive a thermostatic unit 85 disposed in thermal relation with the exhaust manifold 12 of the motor. In the form of the invention shown in Figures 1 to 3 inclusive, the thermostatic unit 85 is in the form of an expansible bellows which is filled with a volatile fluid and which is provided with an operating rod 86 extending downwardly from the unit 85 to a point in the interior of the casing 50. The lower end of the operating rod 86 is provided with a cam member 87 or the equivalent. Preferably this end of the rod 86 and the cam member 87 is passed through the slot 77. The cam member 87 is arranged to cooperate with a correspondingly formed portion 89 on the rack 66, the cooperating cam surfaces serving to cause the rack 66 to shift toward the right, as viewed in Figure 2, whenever the rod 86 is moved downwardly by the expansion of the volatile fluid within the thermostat bellows 85 under the influence of temperature of the exhaust manifold 12. In moving the rack member 66 toward the right in Figure 2 the cam member 87 and the rod 86 react against the end of the slot and the portion of the cover 56. As is obvious, this movement of the rack 66 serves to rotate the needle valve 39 and to move the same toward its seat. Likewise, the movement of the lug 75 toward the right in Figure 2 relieves the arm 35 and allows the spring or other means, normally associated with the choke valve 26, to move the latter toward its open position.

The operation of the structure so far described is substantially as follows. When starting the motor 10, especially when the latter is cold, the operator actuates the button 73 which moves the rack member 66 toward the left in Figure 2, thereby opening the metering valve 39 and causing the lug 75 to close the choke valve 26. This movement is permissible because the thermal unit 85 is contracted when the motor is cold, which disposes the cam 87 in the upper part of the housing 50 and out of the way of the portion 89 of the rack member 66. After the motor has started and the temperature of the same rises, the fluid within the thermal unit 85 expands and forces the rod 86 downwardly, causing the cam 87 to contact with the portion 89 and gradually shift the rack member 66 toward the right in Figure 2. This movement, as explained above, causes the metering valve 39 to move toward its seat and the valve 26 to move toward its open position. The position of both of these valves is thus governed according to the temperature of the motor, specifically, the temperature of the exhaust manifold 12, whereby the valves are gradually restored to normal position without any attention on the part of the operator. During this movement the button 73 is also gradually moved back toward its normal position.

In the event that the motor is started when the temperature thereof is somewhat below its normal operating temperature, the position of the cam 87 will govern the extent to which the valves 26 and 39 may be opened, the higher the temperature of the motor the less will be the permissive opening of these valves. It is also important to observe in this form that the provision of the casing 50 and the associated controls does not in any way affect the normal operation of the choke valve 26 since the pull rod 28 may be actuated at any time it is desired to close the choke valve. In doing so the arm 35 is merely drawn away from its cooperating lug 75.

It is to be understood that although I have shown mechanical means in the form of a cam 87 and a cooperating cam surface 89 on the rack guard 66 for positively shifting the rack member 66 under the control of the temperature of the motor, any other means may be employed if desired. For example, a bell crank may be pivoted to the casing 50 so that one arm thereof will be moved by the rod 66 with the other arm connected to shift the member 66. Obviously, any other equivalent means, either mechanical or non-mechanical, may be employed where desirable or convenient.

Figure 4:
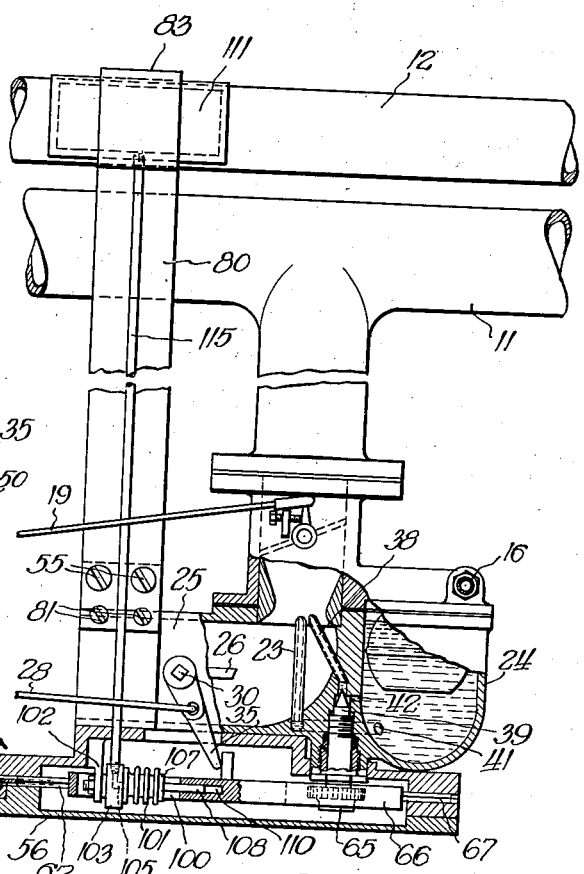
Figure 4 is a modification corresponding to the view shown in Figure 2 but showing a slightly different means for autmatically controlling the position of the shiftable means.

Figure 4 illustrates a modified form of thermostatic control for the rack member 66, and in this figure the latter is branched to provide a space 100 in which is disposed a small bellows 101 and a supporting lug 102 depending from the casing 50, the bellows 101 being mounted upon a suitable block 103 secured to the lug 102 and having a bore 105 communicating with the interior of the bellows 101. The outer end 107 of the bellows 101 is closed and is provided with a guide pin 108 suitably received within a cooperating bore 110 formed in the rack member 66.

The standard 80 carries a closed container 111 in thermal relation with the exhaust manifold 12 of the motor, just as, in Figure 3, the standard 80 supports the thermal element 85 in thermal relation with the exhaust manifold. The container 111 communicates through a small tube 115 with the bore 105, and preferably the bellows 101, tube 115, and container 111 are completely filled with an expansible liquid. Since the container 111 is provided with rigid walls all of the expansive force of the liquid contained therein is effective to expand the bellows 101, thereby moving the end 107 to the right or to the left, in Figure 4, according to whether the temperature of the liquid is increasing or decreasing.

Figure 2:
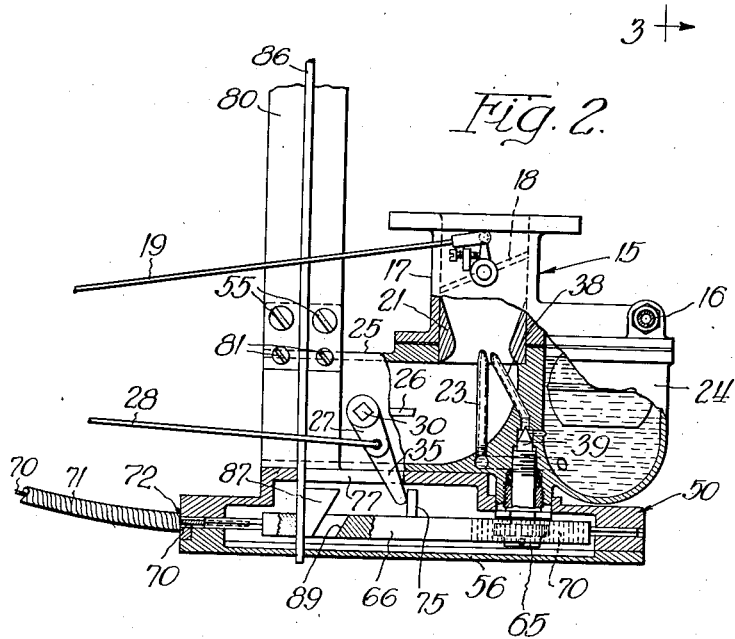
Figure 2 is an enlarged fragmentary detail, partly in section and partly in elevation, and showing in particular the carburetor and the control means therefor.

The expansible bellows operator 101 serves substantially the same purpose as the cooperating cam surfaces 87 and 89 shown in Figure 2; that is, the end 107 serves as a stop to limit the movement of the rack member 66 toward the left in Figure 4 and, after the rack member 66 has been moved to the left when the motor is cold to open the valve 39 and close the choke valve 26, the subsequent heating of the exhaust manifold 12 will raise the temperature of the liquid confined within the container 111, the resulting expansion acting on the bellows 101 to shift the end 107 thereof to gradually move the rack member 66 toward the right in Figure 4. This, as will be apparent, will gradually close the metering valve 39 and will gradually open the choke valve 26.

It will at once be apparent that my invention is susceptible to various modifications. It was mentioned above that the present invention may be utilized to control either the choke valve 26 or the metering valve 39 singly, or both of them together, as shown. For example, it may be desirable to embody the present invention in a means for controlling only the metering valve 39, leaving the choke valve 26 under the exclusive control of the pull rod 28. On the other hand, and particularly where the carburetor is not provided with an easily accessible metering valve, the present invention may be embodied in a means for controlling exclusively the choke valve, either with or without disabling the manually operated pull rod thereof.

It will thus be apparent that my invention is not to be limited to the specific means shown and described but that, in fact, widely different means may be employed in the practice of the broader aspects of my invention.

What I claim, therefore, and desire to secure by Letters Patent is:

1. A control mechanism for the carburetors of internal combustion engines and the like comprising a shiftable member operatively connected with the carburetor to modify the fuel mixture, means including a rack and pinion for shifting said member, a flexible cable connected with said rack for manually shifting the latter to move said shiftable member away from a normal running position to a starting position, and temperature responsive means acting through said first mentioned means for automatically returning said shiftable member back to its normal running position as the temperature of the engine increases.

2. A control mechanism for the carburetors of internal combustion engines and the like comprising a shiftable member operatively connected with the carburetor to modify the fuel mixture, means for shifting said member in one direction from a running position under normal temperature conditions to any one of a plurality of positions for running under low temperature conditions, and means limiting the position of said member when moved in said one direction, said last named means being energized by the heat of the engine and movable to an extent proportional to the temperature thereof for shifting said member from said any one position back in the other direction to said normal position.

3. A control mechanism for the carburetors of internal combustion engines and the like comprising a shiftable member operatively connected with the carburetor to modify the fuel mixture, means for shifting said member in one direction away from a running position under normal temperature conditions, a movable part serving as a stop for limiting the movement of said shiftable member away from said normal position, and means energized by the heat of the engine and movable to an extent proportional to the temperature thereof for shifting said last mentioned means back to its original position to restore said shiftable member to its normal running position.

4. A control mechanism for the carburetors of internal combustion engines and the like and in which the carburetor includes an adjustable metering valve adapted to be opened and a choke valve adapted to be closed to enrich the fuel mixture, said control mechanism comprising manually movable means for opening said metering valve, an arm on said choke valve, a stop carried by said manually movable means and engageable with said arm to close the choke valve when said manually movable means is operated to open said metering valve, means responsive to the temperature of the engine, and means controlled thereby and disposed in the path of movement of said manually movable means for automatically shifting the same back to its original position for opening the choke valve and closing said metering valve as the temperature of the engine rises.

5. A control mechanism for the carburetor of an internal combustion engine or the like and in which the carburetor includes an adjustable valve movable to modify the fuel mixture, said control mechanism comprising a manually movable member acting to adjust the position of said valve for temporarily enriching the fuel mixture, means serving as a thermostat responsive to the temperature of the engine, and cam means disposed in the path of movement of said manually movable means and energized by said thermostat for automatically restoring said valve to its original position in response to a rise in temperature of the engine.

6. A control mechanism for the carburetor of an internal combustion engine or the like and in which the carburetor includes an adjustable valve movable to modify the fuel mixture, said control mechanism comprising a manually movable member acting to adjust the position of said valve for temporarily enriching the fuel mixture, means serving as a thermostat responsive to the temperature of the engine, a member disposed in the path of movement of said manually movable means and adapted to shift the latter back to its original position but arranged to be freely movable away from said manually movable means, whereby said member is capable of actuating said manually movable means in one direction only, and means operatively connecting said member with said thermostat for restoring said adjustable valve to its original position for gradually reducing the enrichment of said fuel mixture as the temperature of the engine rises.

7. A control mechanism for the carburetors of internal combustion engines and the like and in which the carburetor includes an adjustable part movable to modify the fuel mixture, said control mechanism comprising temperature sensitive means responsive to the temperature of the engine and connected with said part for positively moving the same into a normal running position as the engine warms up, said temperature responsive means being freely movable in the other direction independently of said adjustable part when the engine temperature decreases, and manually movable means for shifting said part in said other direction into a position limited by the position of said temperature responsive means for starting the engines.

8. A control mechanism for the carburetors of internal combustion engines and the like and in which the carburetor includes an adjustable valve movable to modify the fuel mixture, said control mechanism comprising manually movable means for adjusting the position of said valve, and means responsive to the temperature of the engine for limiting the position of the valve when moved away from its normal running position by said manually movable means and adapted to react against said valve and shift the same back to its original position at a rate proportional to the rate of increase in temperature of the engine.

HERBERT E. BUCKLEN.